(12) United States Patent
Shimizu et al.

(10) Patent No.: US 7,919,877 B2
(45) Date of Patent: Apr. 5, 2011

(54) FAUCET GENERATOR

(75) Inventors: Takeshi Shimizu, Fukuoka (JP); Makoto Hatakeyama, Fukuoka (JP); Masahiro Kuroishi, Fukuoka (JP); Naoyuki Onodera, Fukuoka (JP); Tomoko Sato, Fukuoka (JP)

(73) Assignee: Toto Ltd., Fukuoka (JP)

( * ) Notice: Subject to any disclaimer, the term of this patent is extended or adjusted under 35 U.S.C. 154(b) by 306 days.

(21) Appl. No.: 12/177,040

(22) Filed: Jul. 21, 2008

(65) Prior Publication Data

US 2009/0026768 A1 Jan. 29, 2009

Related U.S. Application Data

(60) Provisional application No. 60/984,733, filed on Nov. 2, 2007.

(30) Foreign Application Priority Data

Jul. 23, 2007 (JP) ................................ 2007-191353
Jul. 15, 2008 (JP) ................................ 2008-183614

(51) Int. Cl.
*F03B 13/00* (2006.01)
*H02P 9/04* (2006.01)

(52) U.S. Cl. .......................................... 290/43; 290/54

(58) Field of Classification Search ............... 290/1 R, 290/1 A, 43, 54; 310/268, 168, 216; 60/398, 60/608, 325, 671; 166/54.1, 66.5; 175/107; 416/85; 415/185

See application file for complete search history.

(56) References Cited

U.S. PATENT DOCUMENTS

| | | | | |
|---|---|---|---|---|
| 2,097,166 A | * | 10/1937 | Stone | 392/481 |
| 4,511,806 A | * | 4/1985 | May | 290/43 |
| 4,731,545 A | * | 3/1988 | Lerner et al. | 290/54 |
| 5,140,254 A | * | 8/1992 | Katzman | 322/35 |
| 5,362,987 A | * | 11/1994 | Cassaday et al. | 290/54 |
| 5,554,922 A | * | 9/1996 | Kunkel | 322/3 |
| 6,011,334 A | * | 1/2000 | Roland | 310/86 |
| 6,036,333 A | * | 3/2000 | Spiller | 362/192 |
| 7,253,536 B2 | * | 8/2007 | Fujimoto et al. | 290/43 |
| 7,608,936 B2 | * | 10/2009 | Shimizu et al. | 290/43 |
| 2008/0217923 A1 | * | 9/2008 | Yen | 290/54 |
| 2008/0231056 A1 | * | 9/2008 | Wen | 290/54 |
| 2008/0284174 A1 | * | 11/2008 | Nagler | 290/54 |
| 2009/0188995 A1 | * | 7/2009 | Onodera et al. | 239/383 |

FOREIGN PATENT DOCUMENTS

JP 2004-336982 A 11/2004

* cited by examiner

*Primary Examiner* — Tho D Ta
(74) *Attorney, Agent, or Firm* — Kimble Intellectual Property Law, PLLC

(57) ABSTRACT

A faucet generator includes: a cylindrical body which has a water inflow port and a water outflow port, and in which a water supply channel is formed; a rotor vane which has rotor vane blades, and which is disposed in the water supply channel; a magnet which is rotatable integrally with the rotor vane; a coil in which an electromotive force is produced by rotation of the magnet; and a plurality of nozzles which eject water toward the rotor vane blades. The axial direction of the rotor vane is substantially parallel to the water supply channel. The nozzles change a direction of a water flow which is substantially parallel to the axial direction of the rotor vane, to eject water from a radially outward direction of the rotor vane blades to the rotor vane blades.

4 Claims, 14 Drawing Sheets

FAUCET GENERATOR

This application claims the benefit of U.S. Provisional Application No. 60/984,733, filed Nov. 2, 2007. This application also claims priorities from Japanese Patent Application No. 2007-191353, filed on Jul. 23, 2007 and Japanese Patent Application No. 2008-183614, filed on Jul. 15, 2008 in the Japanese Patent Office. This disclosure of each of these applications is incorporated herein in their entirety by reference.

TECHNICAL FIELD

The present invention relates to a faucet generator which generates electricity by using a flow of water supply.

Conventionally, an automatic faucet apparatus has been known in which a hand introduced under a tap is sensed by a sensor, and water is automatically discharged from the tap. Also an apparatus has been known in which a small generator is disposed in a channel of such an automatic faucet apparatus, an electric power obtained by the generator is stored, and the stored power is supplied additionally to a circuit such as the sensor (for example, see Patent Reference 1).

In such a faucet apparatus, an axial-flow generator which can be easily miniaturized is used. As such an axial-flow generator, there are a generator having "radial arrangement" in which a coil is disposed radially outside a magnet (for example, see FIG. 4 of Patent Reference 1), and a generator having "axial arrangement" in which a coil is disposed so as to be opposed to an end face of a magnet that is substantially perpendicular to a radial direction (for example, see FIG. 5 of Patent Reference 1). In an application where a generator having a small radial dimension is required, the use of a generator of "axial arrangement" is more preferable than that of a generator of "radial arrangement".

For example, an axial-flow generator disclosed in Patent Reference 1 has a configuration where a rotor vane is rotated by swirling flows formed by ejection ports. In such a case, the swirling flows receive a centrifugal force to tend to spread in a radially outward direction, and hence the amount of water flowing to a bypass channel is increased to cause the impeller efficiency to be lowered.

In order to enable the rotor vane to be stably rotated, ejection flows must evenly impinge on rotor vane blades. However, the swirling flows receive a centrifugal force to tend to spread in a radially outward direction. Therefore, it is difficult to cause the ejection flows to evenly impinge on the rotor vane blades by using the swirling flows.

[Patent Reference 1] Japanese Patent Unexamined Application Publication No. 2004-336982

SUMMARY

The invention provides a faucet generator in which the radial dimension is small, the amount of water flowing to a bypass channel can be suppressed, and dispersion of ejection flows impinging on rotor vane blades can be reduced.

Means for Solving the Problems

According to an aspect of the invention, the faucet generator of the invention includes: a cylindrical body which has a water inflow port and a water outflow port, and in which a water supply channel is formed; a rotor vane which has rotor vane blades, and which is disposed in the water supply channel; a magnet which is rotatable integrally with the rotor vane; a coil in which an electromotive force is produced by rotation of the magnet; and a plurality of nozzles which eject water toward the rotor vane blades. The axial direction of the rotor vane is substantially parallel to the water supply channel. The nozzles change a direction of a water flow which is substantially parallel to the axial direction of the rotor vane, to eject water from a radially outward direction of the rotor vane blades to the rotor vane blades.

According to the invention, a faucet generator is provided in which the radial dimension is small, the amount of water flowing to a bypass channel can be suppressed, and dispersion of ejection flows impinging on rotor vane blades can be reduced.

Figure 1:
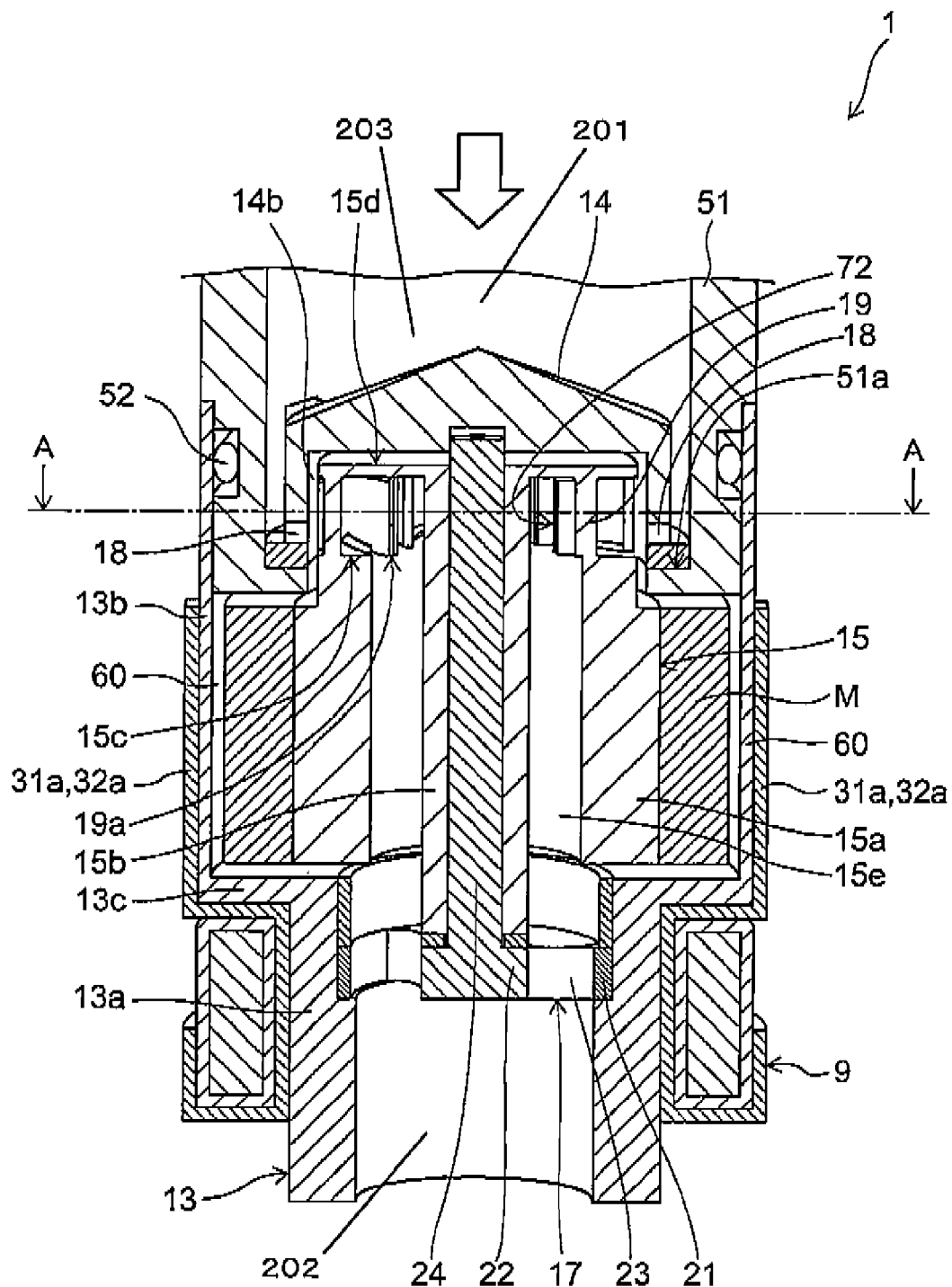
FIG. 1 is a schematic sectional view of a generator of an embodiment of the invention.

DESCRIPTION OF REFERENCE NUMERALS AND SIGNS 1 generator, 1a generator, 3 automatic faucet apparatus, 9 stator, 13 cylindrical body, 14 cap, 14a flange portion, 14b space portion, 15 rotor vane, 15a rotor vane ring, 15b boss portion, 15c blade supporting face, 15d ceiling portion, 15e water channel, 18 nozzle, 18a nozzle, 19 rotor vane blade, 31a inductor, 32a inductor, 50 coil, 50a coil, 60 bypass channel, 62a water flow, 90 stator, 131a inductor, 132a inductor, 201 water inflow port, 202 water outflow port, 203 water supply channel, 204 barrier, 501 post, M magnet, M1 magnet

DETAILED DESCRIPTION

Hereinafter, embodiments of the invention will be described with reference to the drawings.

In the drawings, identical components are denoted by the same reference numerals.

FIG. 1 is a schematic sectional view of a generator 1 of an embodiment of the invention.

The generator 1 mainly includes a water inflow port 201, a water outflow port 202, a water supply channel 203, a cylindrical body 13, a cap 14, a rotor vane 15, a magnet M, a stator 9, and a sealing member 51. These components are housed in a case 12 (see FIG. 3). The arrow which is drawn above the cap 14 indicates the direction of flowing water.

Prior to description of the generator 1, a automatic faucet apparatus 3 including the generator 1 will be described.

Figure 2:
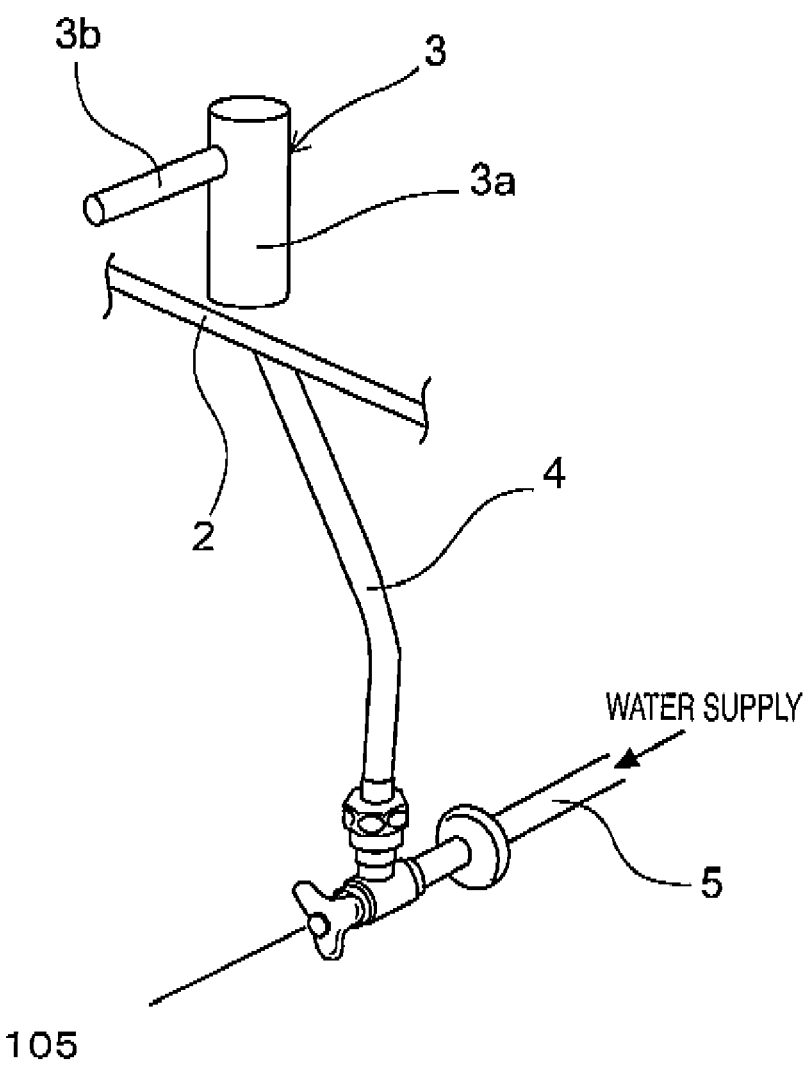
FIG. 2 is a schematic view illustrating an example of mounting of an automatic faucet apparatus including the generator of the embodiment of the invention.

FIG. 2 is a schematic view illustrating an example of mounting of an automatic faucet apparatus including the generator of the embodiment of the invention (hereinafter, often referred to as simply an automatic faucet apparatus).

Figure 3:
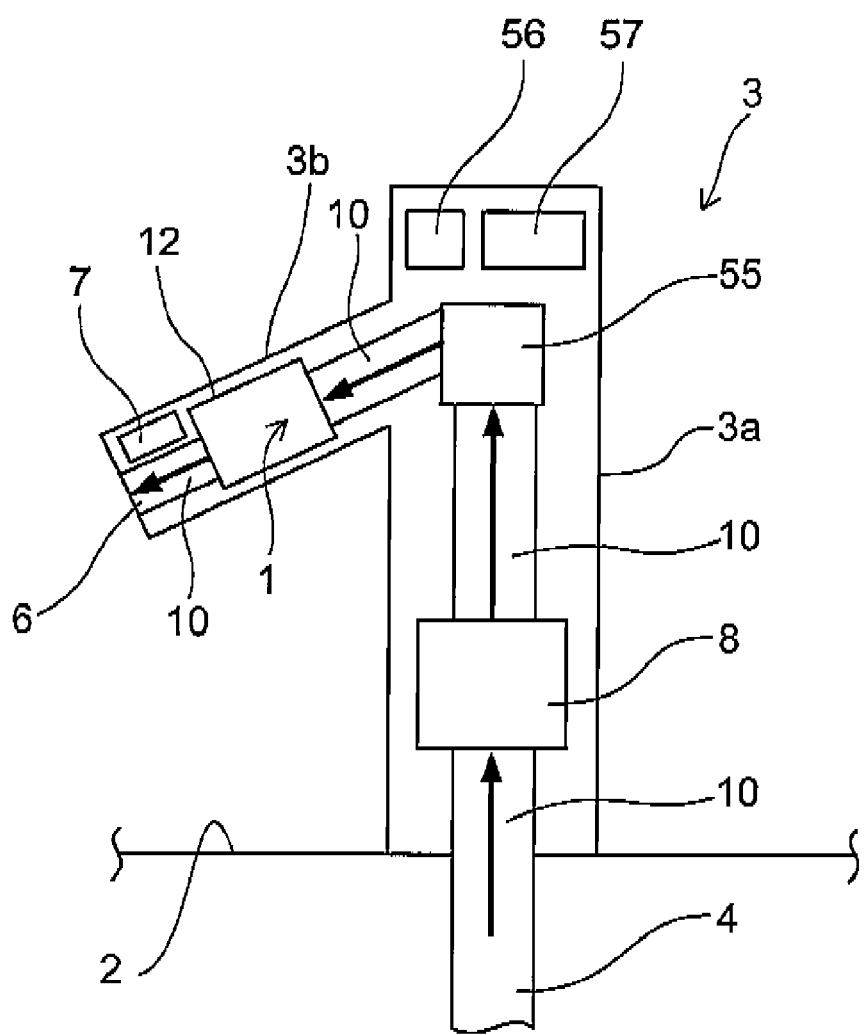
FIG. 3 is a schematic sectional view of the automatic faucet apparatus including the generator of the embodiment of the invention.

FIG. 3 is a schematic sectional view of the automatic faucet apparatus including the generator of the embodiment of the invention.

In the figures, the arrows indicate the direction of flowing water.

The automatic faucet apparatus 3 is mounted in, for example, a washstand 2. The automatic faucet apparatus 3 is connected to a water inflow port 5 for tap water or the like, through a piping 4. The automatic faucet apparatus 3 has a cylindrical body 3a, and a water discharger 3b which is disposed in an upper portion of the body 3a, and which extends in a radially outward direction of the body 3a. A water discharging port 6 is formed at the tip end of the water discharger 3b, and a sensor 7 is incorporated in the vicinity of the water discharging port 6.

A water supply channel 10 which guides water that inflows from the water inflow port 5 and flows through the piping 4, to the water discharging port 6 is formed inside the automatic faucet apparatus 3. The body 3a incorporates a solenoid valve 8 which opens and closes the water supply channel 10, and, on the downstream side of the solenoid valve 8, a constant flow valve 55 which restricts the amount of water discharge to a constant value. A reducing valve or regulating valve (which is not shown) may be incorporated in the upstream side of the solenoid valve 8 in order to reduce the water supply pressure in the case where the water supply pressure of tap water or the like is higher than the use pressure. The constant flow valve 55, the reducing valve, and the regulating valve may be adequately disposed as required.

The generator 1 is disposed inside the water discharger 3b, on the downstream side of the constant flow valve 55. A charger 56 which stores the power generated by the generator 1, and a controller 57 which controls the driving of the sensor 7 and the opening and closing operations of the solenoid valve 8 are disposed inside the body 3a. Since the generator 1 is disposed downstream from the solenoid valve 8 and the constant flow valve 55, the water supply pressure (primary pressure) of the tap water does not directly act on the generator 1. Therefore, the generator 1 is not requested to have a high pressure tightness, and this arrangement is advantageous in reliability and cost.

The charger 56 and the controller 57 are connected to each other through wirings which are not shown, and placed at positions which are in an upper portion of the body 3a and above the highest position of the water supply channel 10. Even when a water drop due to condensation on the outer face of a channel piping forming the water supply channel 10 falls or flows down along the channel piping, therefore, it is possible to prevent the controller 57 from being submerged, and also a failure of the controller 57 from occurring. Similarly, also the charger 56 is disposed above the water supply channel 10. Therefore, it is possible to prevent the charger 56 from being submerged, and also a failure of the charger 56 from occurring.

A coil 50 (see FIG. 5) disposed in the generator 1, and the controller 57 are connected to each other through wirings which are not shown, thereby enabling the output of the coil 50 to be sent to the charger 56 through the controller 57.

The faucet generator 1 is not restricted to be disposed inside faucet metal fittings (the body 3a and the water discharger 3b) of the faucet apparatus 3. For example, the faucet generator may be disposed in the piping (channel) 4 which connects between the faucet metal fittings of the faucet apparatus 3 and a stop cock (main cock) 105 (see FIG. 2) that is disposed upstream thereof.

The automatic faucet apparatus 3 is preferably used in a living environment. It is used as a kitchen faucet apparatus, a living and dining faucet apparatus, a shower faucet apparatus, a toilet faucet apparatus, and a lavatory faucet apparatus. The generator 1 of the this embodiment is not limited to the automatic facet apparatus 3 using a human body detection sensors but is also applicable to a one-touch faucet apparatus which is manually switched on/off, a metering faucet apparatus which meters the flow and automatically stops discharging water, and a timed faucet apparatus which stops discharging water after a preset period of time has elapsed. The generated electric power may be used for illumination, generation of electrolyzed functional water such as alkali ion water and silver ion-containing water, flow rate display (metering), temperature display, and voice guidance.

In the automatic faucet apparatus 3, the discharge flow rate is illustratively set to 100 liters per minute or less, and preferably to 30 liters per minute or less. In particular, in the lavatory faucet, it is preferably set to 5 liters per minute or less. In the case of relatively high discharge flow rate such as in toilet faucet, it is preferable that the water flow to the generator 1 be branched from the water supply pipe to regulate the flow rate through the generator 1 to 30 liters per minute or less. This is because, if the water flow from the water supply pipe is entirely passed through the generator 1, the number of revolutions of the rotor vane 15 in the generator 1 increases, causing concern about the possibility of increasing noise and shaft wear. Furthermore, above an appropriate number of revolutions, the amount of power generation does not increase despite the increase of the number of revolutions, because of energy loss due to eddy current and coil heating. In Japan, for example, the water pressure of a water pipe to which the faucet apparatus is mounted may be sometimes as low as about 50 kPa.

Then, referring again to FIG. 1, the generator 1 will be described.

The cylindrical body 13 has a stepped shape consisting of a small-diameter portion 13a and a large-diameter portion 13b, and is disposed in the water discharger 3b which is shown in FIGS. 2 and 3, in a state where the interior of the cylindrical body communicates with the water supply channel. In this case, the cylindrical body 13 (rotor vane 15) is disposed in such a manner that the center axis direction of the cylindrical body 13 (rotor vane 15) is substantially parallel to the direction of flowing water. Further, the cylindrical body 13 is formed in such a manner that the small-diameter portion 13a is directed toward the upstream side, and the large-diameter portion 13b is directed toward the downstream side.

In the cylindrical body 13, in the sequence starting from the upstream side, the water inflow port 201, a cap 14, the rotor vane 15, the bearing 17, and the water outflow port 202 are disposed. The water supply channel 203 is disposed between the water inflow port 201 and the water outflow port 202. The bearing 17 is disposed inside the small-diameter portion 13a, and the cap 14 and the rotor vane 15 are disposed inside the large-diameter portion 13b.

The opening at the upstream end of the large-diameter portion 13b is liquid-tightly closed by the sealing member 51 through the O-ring 52. A stepped hole is disposed inside the sealing member 51. The step portion 51a of the member is annularly formed, and the cap 14 is supported on the step portion 51a. The cap 14 is fixed to the cylindrical body 13, and is not rotated.

The cap 14, and the nozzles 18 which are disposed in the circumferential face of the cap 14 will be described in detail later.

The rotor vane 15 is disposed on the downstream side of the cap 14. The rotor vane 15 has a columnar shape, and the plurality of projective rotor vane blades 119 which are projected in a radially inward direction are disposed. Each space which is between adjacent ones of the rotor vane blades 119 in the circumferential direction functions as the rotor vane channel 172. The rotor vane blades 19 will be described in detail later.

A gap which enables the rotor vane 15 to be rotatable is disposed between an end face of a rotor vane ring 15a (which will be described later) and the magnet M, and the cylindrical body 13 and the sealing member 51. The gap functions as a bypass channel 60.

The center shaft 24 which is integrated with the bearing 17 is disposed so as to be projected toward the upstream side. The center shaft 24 is passed through a boss portion 15b of the rotor vane 15 so that the rotor vane 15 is rotatable about the center shaft 24. Alternatively, the rotor vane 15 and the center shaft 24 may be integrated with each other, and both end portions of the center shaft 24 may be supported by the cap 14 and the bearing 17, so that the rotor vane 15 which is integrated with the center shaft 24 is rotated. Namely, the rotor vane 15 having the rotor vane blades may be disposed in the water supply channel so that the axial direction of the rotor vane 15 is substantially parallel to the water supply channel. Here, the axial direction of the rotor vane 15 is identical with the direction of the center shaft 24.

The bearing 17 includes: a ring member 21 which is fixed to the inner circumferential face of the cylindrical body 13; and the shaft supporting portion 22 which is disposed at the center of the ring member 21. The ring member 21 and the shaft supporting portion 22 are coupled to each other by the coupling members 23 which are radially disposed. The gaps between the coupling members 23 are not closed, and are passed through the bearing. Therefore, the water flow inside the cylindrical body 13 is not disturbed.

The rotor vane ring 15a which is disposed downstream from the rotor vane blades 19, and on the side end face on the radially outer side, and the annular magnet M which is fixed to an outer circumferential portion of the rotor vane ring 15a are housed in the large-diameter portion 13b of the cylindrical body 13. Outside the small-diameter portion 13a of the cylindrical body 13, the stator 9 is disposed so as to be opposed to an end face which is on the downstream side of the magnet M, and which is substantially perpendicular to a radial direction. The magnet M is disposed between the rotor vane blades 19 and the water outflow port 202. In the case where the magnet M is placed in this way, it is possible to dispose a generator in which, even when the radial dimension is small, the generated electricity amount can be ensured. The reason of this is that the magnet M which is large in a radial direction can be placed in a space which is between the rotor vane blades 19 and the water outflow port 202, and which is on the downstream side of the nozzles 18.

The embodiment has the structure ("axial arrangement") where the stator 9 is opposed to the end face of the magnet M which is substantially perpendicular to a radial direction. In the embodiment, therefore, the radial dimension can be reduced as compared with the case where the stator 9 is opposed to the radially outside of the magnet M ("radial arrangement"). Furthermore, the radial dimension of the rotor vane 15 can be increased by a degree corresponding to the configuration in which the stator 9 is not disposed radially outside the rotor vane 15, so that the generated electricity amount can be increased.

In the case where the cylindrical body 13 is formed by a material having a low electrical conductivity, such as a resin, the eddy current loss can be reduced as compared with the case where the cylindrical body is formed by a metal, and hence the generated electricity amount can be further increased. In this case, only the large-diameter portion 13b through which magnetic fluxes are passed may be formed by a material having a low electrical conductivity, such as a resin.

First, the magnet M and the stator 9 will be described.

Figure 4:
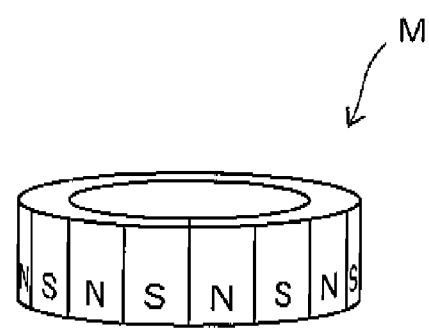
FIG. 4 is a schematic perspective view illustrating a magnet.

FIG. 4 is a schematic perspective view illustrating the magnet M.

Figure 5:
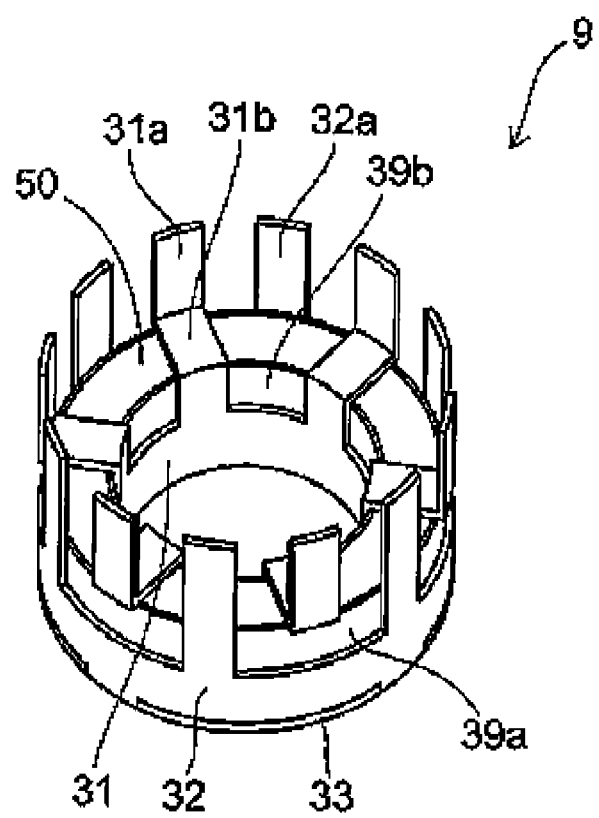
FIG. 5 is a schematic perspective view illustrating a stator.

FIG. 5 is a schematic perspective view illustrating the stator 9.

As shown in FIG. 4, the end face (outer circumferential face) of the magnet M in a radially outward direction is alternately magnetized with N and S poles along the circumferential direction.

As shown in FIG. 5, the stator 9 has; first and second yokes 31, 32 all of which are made of a soft magnetic material (for example, rolled steel); the inductor 31a, yoke 31b, and inductor 32a which are continuously contacted with the yokes; and a coil 50 which is placed in a space surrounded by the first and second yokes 31, 32, the inductor 31a, the yoke 31b, and the inductor 32a.

In the coil 50 which is cylindrically wound, an inner circumferential face portion, an outer circumferential face portion, and both end face portions in the direction which is substantially perpendicular to the radial direction are surrounded by the first yoke 31, the second yoke 32, the inductor 31a, the yoke 31b, the inductor 32a, and the third yoke 33.

The first yoke 31 has a substantially cylindrical shape, and is placed so as to surround an inner circumferential face portion of the coil 50. The plurality of yokes 31b are integrally disposed toward the radially outer side, in one end portion of the yoke in the direction which is substantially perpendicular to the radial direction. In the first yoke 31, a portion which is opposed to the inner circumferential face portion of the coil 50 is substantially perpendicular to the yokes 31b. The yokes 31b are placed at regular intervals along the circumferential direction of the coil 50. Furthermore, the inductors 31a are disposed to extend in the direction which is substantially perpendicular to the radial direction of the coil 50, on one ends of the yokes 31b.

The second yoke 32 has a substantially cylindrical shape, and is placed so as to surround an outer circumferential face portion of the coil 50. The plurality of inductors 32a are integrally disposed toward the direction which is substantially perpendicular to the radial direction, in one end portion of the yoke in the direction which is substantially perpendicular to the radial direction. The inductors 32a are placed at regular intervals along the circumferential direction of the coil 50, and between the inductors 31a of the first yoke 31. Namely, the inductors 31a of the first yoke 31 and the inductors 32a of the second yoke 32 are arranged alternately and separately in the circumferential direction of the coil 50. The inductors 31a and the inductors 32a are disposed immediately above a portion (the second yoke 32) which is placed so as to surround an outer circumferential face portion of the coil 50. The distances from the center of the coil 50 to the inductors 31a and the inductors 32a are approximately equal to each other.

The inductors 31a, 32a are disposed so as to extend in the direction which is substantially perpendicular to the radial direction from the outer circumferential face of the coil 50. The inner circumferential faces (the face on the side located in the center direction of the coil 50) of the inductors are opposed to the outer circumferential face (the face in a radial direction) of the magnet M. The yokes 31*b* are opposed to one end face portion of the coil 50. The other end face portion of the coil 50 is opposed to the end face of the magnet M which is substantially perpendicular to the radial direction across the yokes 31*b* and a flange 13*c* of the cylindrical body 13.

In order to reduce the radial dimension of the generator 1, also the radial dimension of the magnet M must be reduced. In this case, however, it is not required to reduce the dimension of the magnet M which is substantially perpendicular to a radial direction, and, in some cases, the dimension can be increased.

In the embodiment, the inductors 31*a*, 32*a* are disposed to be opposed to the outer circumferential face of the magnet M. Therefore, magnetic fluxes from the outer circumferential face of the magnet M can be guided to the coil 50 through the inductors 31*a*, 32*a*. Even when the radial dimension is reduced, therefore, the influence due to the reduction can be made small, and a predetermined generated electricity amount can be ensured.

When the radial dimension of the generator 1 can be reduced in this way while ensuring the generated electricity amount, for example, also the dimension of the automatic faucet apparatus 3 in which the generator 1 is disposed can be reduced. As a result, the installation property and operability of the automatic faucet apparatus 3, and the like can be improved. Moreover, the tolerance for employment of the appearance design of the automatic faucet apparatus 3 can be improved. For example, a modern design in which the apparatus is more slender than a conventional one may be employed.

The third yoke 33 has a ring plate shape, and is disposed to be opposed to the other end face portion of the coil 50. A part of the outer circumferential side of the third yoke 33 is cut away so that a coil wiring takeout portion which is not shown is formed.

The third yoke 33 is coupled to end portions of the first and second yokes 31, 32 which are opposite to the end portions where the inductors 31*a*, 31*b*, 32*a* are disposed. The coil 50 is housed in a space surrounded by the first to third yokes 31 to 33. Wirings from the coil 50 are drawn out from the coil wiring takeout portion which is formed in the outer circumferential side of the third yoke 33, and which is not shown, to the outside. In this way, the wirings of the coil 50 are drawn out from the outer circumferential side to the outside through the coil wiring takeout portion which is formed in the outer circumferential side of the third yoke 33, and which is not shown. As compared with the case where the wirings are drawn out from the inner circumferential side, therefore, the wirings to the controller 57 are laid more easily.

For example, convex-like positioning portions are disposed in the third yoke 33. When the positioning portions are engaged with concave-like cutaway portions formed in the first and second yoke 31, 32, the first and second yoke 31, 32 are positioned at predetermined positions in the circumferential direction, respectively. According to the configuration, the pitch accuracy between the inductors 31*a*, 32*a* can be improved. Alternatively, concave-like cutaway portions may be disposed in the third yoke 33, and convex-like positioning portions may be disposed in the first and second yoke 31, 32.

The cutaway portions 39*a* are disposed in the second yoke 32, and the cutaway portions 39*b* are disposed in the third yoke 33. In this way, in the yokes 32, 33, the cutaway portions 39*a*, 39*b* which are formed by cutting away portions between adjacent inductors from the one end sides where the inductors 31*a*, 32*a* are disposed are intermittently disposed in the portion which is disposed so as to surround the circumferential face portion of the coil 50, whereby the yokes 32, 33 are magnetically insulated in the circumferential direction. In the magnetic path which is formed along the circumferential faces of the yokes 32, 33, portions which are not required for electricity generation are cut away, so that the iron loss can be reduced and the generated electricity amount can be increased.

Although the case where the stator 9 is placed to be opposed to the downstream end face of the magnet M has been described, the stator 9 may be placed to be opposed to the upstream end face of the magnet M, or a pair of stators 9 may be placed to be opposed respectively to the upstream and downstream end faces of the magnet M.

Next, the swirling flow and the bypass flow will be described.

Figure 6:
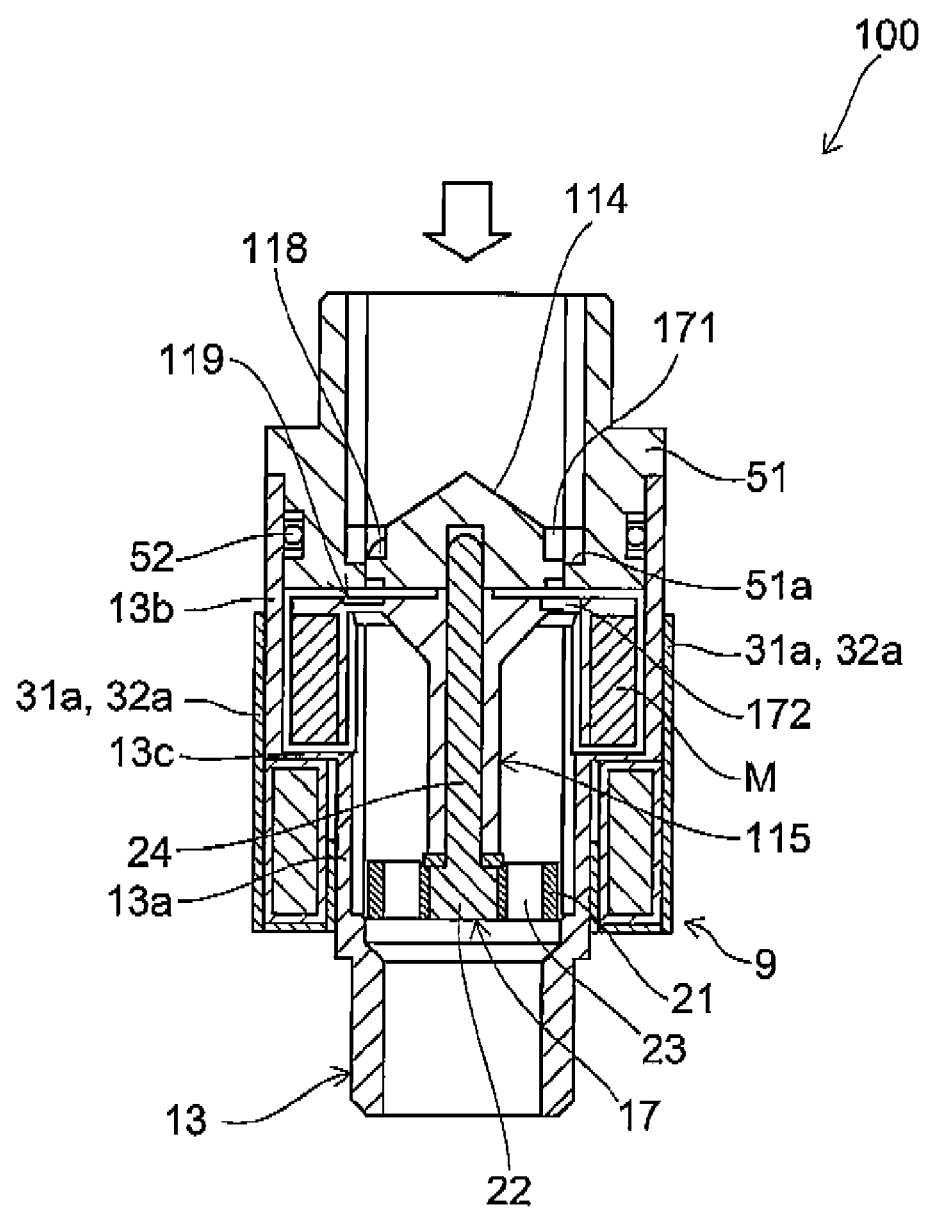
FIG. 6 is a schematic sectional view of a generator of a comparative example.

FIG. 6 is a schematic sectional view of a generator of a comparative example.

The components which are identical with those that have been described with reference to FIG. 1 are denoted by the same reference numerals, and their description is omitted.

FIG. 6 shows the generator 100 which was studied in the course of performing the invention by the inventors. The generator mainly includes the cylindrical body 13, a pre-rotation stator vane 114, the rotor vane 15, the magnet M, the stator 9, and the sealing member 51. The arrow which is drawn above the pre-rotation stator vane 114 indicates the direction of flowing water.

The pre-rotation stator vane 114 has a shape in which a conical member is disposed integrally on one end face (the face positioned on the upstream side) of a columnar member. A plurality of projective stator vane blades 118 which are projected in a radially outward direction are disposed on the circumferential face of the pre-rotation stator vane 114. The stator vane blades 118 are inclined from the upstream side toward the downstream side while being twisted in the rightward direction about the axis center of the pre-rotation stator vane 114. Each space which is between the stator vane blades 118 that are adjacent to each other in the circumferential direction functions as a stator vane channel 171. The pre-rotation stator vane 114 is fixed to the cylindrical body 13, and is not rotated.

The rotor vane 115 is disposed on the downstream side of the pre-rotation stator vane 114. The rotor vane 115 has a columnar shape, and a plurality of projective rotor vane blades 119 which are projected in a radially outward direction are disposed on the circumferential face of the rotor vane. Contrary to the stator vane blades 118, the rotor vane blades 119 are inclined from the upstream side toward the downstream side while being twisted in the leftward direction about the axis center. Each space which is between adjacent ones of the rotor vane blades 119 that are adjacent to each other in the circumferential direction functions as a rotor vane channel 172.

The flowing water flowing into the cylindrical body 13 flows over the surface of the conical member of the pre-rotation stator vane 114 to spread radially outward, and is formed as a swirling flow which swirls in the rightward direction about the axis center, to flow through the stator vane channels 171 between the stator vane blades 118.

The swirling flow which has flown through the stator vane channels 171 enters the rotor vane channels 172, and impinges on the upper inclined faces of the rotor vane blades 119. The swirling flow entering the rotor vane channels 172 is a flow which swirls in the rightward direction about the axis center, and hence a rightward force acts on the rotor vane blades 119, so that the rotor vane 115 is rotated in the rightward direction. The flowing water which flows through the rotor vane channels 172 that are inside the inner circumferential face of the magnet M passes through the inside of the bearing 17, and then passes through the interior of the cylindrical body 13.

Figure 7:
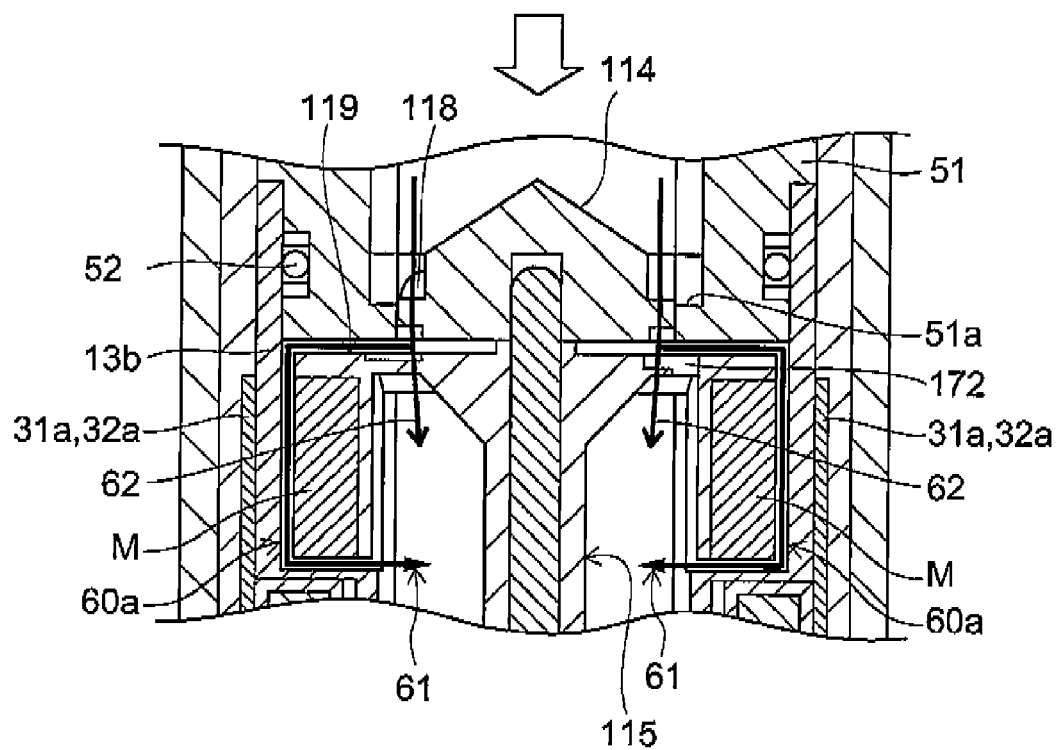
FIG. 7 is a schematic enlarged sectional view of a rotor vane portion in FIG. 6.

FIG. 7 is a schematic enlarged sectional view of a rotor vane portion in FIG. 6.

The components which are identical with those that have been described with reference to FIGS. 1 and 6 are denoted by the same reference numerals, and their description is omitted.

As shown in FIG. 7, a gap which enables the rotor vane 115 to be rotatable is disposed between the end face of the rotor vane 115 and the magnet M, and the cylindrical body 13 and the sealing member 51. The gap functions as a bypass channel 60a.

As described above, the swirling flow 62 which flows through the stator vane channels 171 receives a centrifugal force to tend to spread in a radially outward direction. In the vicinity of the outlets of the stator vane channels 171, then, part of the swirling flow 62 which tends to spread in a radially outward direction flows as a bypass flow 61 into the bypass channels 60a.

The bypass flow 61 does not contribute to the rotation of the rotor vane 115, i.e., the power generation. As the amount of the bypass flow 61 is larger, therefore, the impeller efficiency is more reduced.

Here, "impeller efficiency" means the efficiency of conversion of hydro energy to rotational energy, and can be obtained by following Expression (1).

[Exp. 1]

$$(T \times N)/(\Delta P \times Q) \tag{1}$$

where T is the rotational torque, N is the number of rotations, $\Delta P$ is the hydro pressure, and Q is the flow amount. Therefore, the numerator or T·N indicates the rotational energy, and the denominator or $\Delta P \cdot Q$ indicates the hydro energy.

As a result of studies, the inventors has found that, in the case where, when the rotor vane is to be rotated, a flow flowing from the radially outer side of the rotor vane blades toward the inner side can be formed, the formation of a flow which tends to spread in a radially outward direction can be suppressed, and hence the amount of the bypass flow 61 which flows into the bypass channels 60a can be suppressed.

Furthermore, the inventors has found that, when a plurality of nozzles which change the direction of water flow flowing in a direction that is substantially parallel to the axial direction (the center axis direction) of the rotor vane, to eject water from the radially outer side of the rotor vane blades toward the inner side, ejection flows can impinge on the rotor vane blades while suppressing the dispersion, and the rotor vane can be stably rotated. When ejection flows do not evenly impinge on the rotor vane blades, the hydro pressure is biasedly applied to the rotor vane blades, thereby producing a problem in that the rotor vane vibrates. In the case where ejection flows can evenly impinge on the rotor vane blades while suppressing the dispersion, however, the rotor vane can be stably rotated.

FIG. 8(a) is a schematic perspective view illustrating the cap 14 disposed in the generator 1 of the embodiment.

Figure 9:
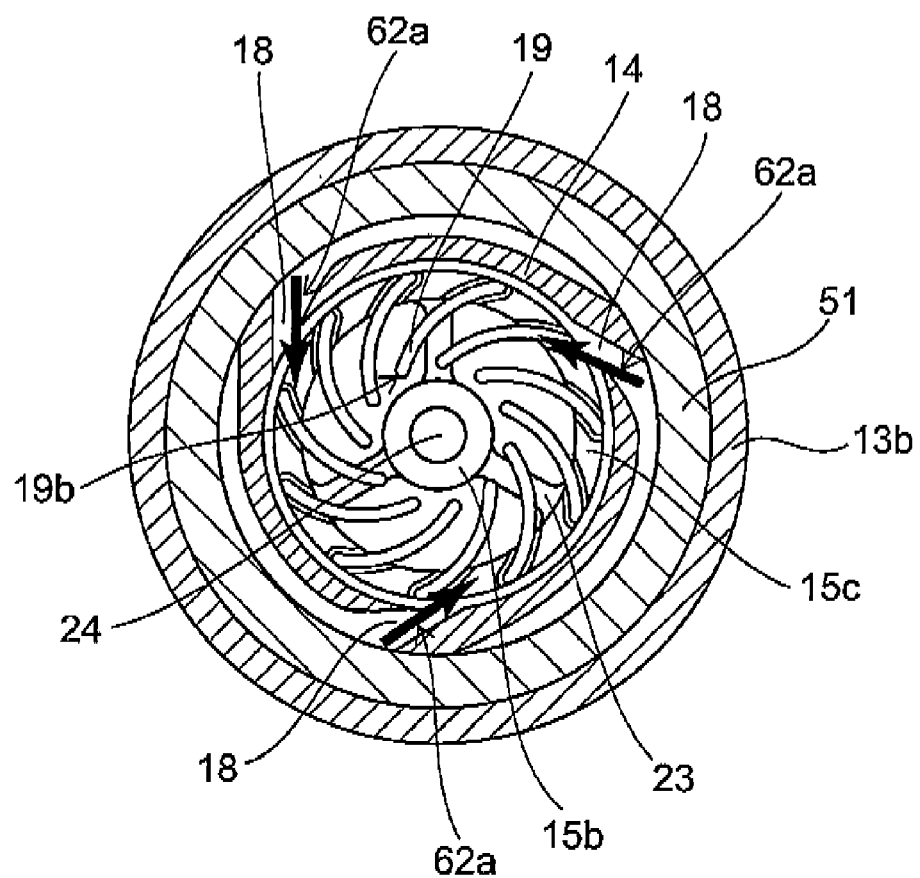
FIG. 9 is a sectional view looking in the direction of the arrow A-A in FIG. 1.

FIG. 9 is a sectional view looking in the direction of the arrow A-A in FIG. 1.

The components which are identical with those that have been described with reference to FIG. 1 are denoted by the same reference numerals, and their description is omitted.

As shown in FIGS. 8(a) and 9, the cap 14 has a shape in which a conical member is disposed integrally on one end face (the face positioned on the upstream side) of a columnar member. A flange portion 14a is disposed on the other end face (the face positioned on the downstream side) of the columnar member.

A space portion 14b (see FIG. 1) having a columnar shape which is opened in the end face where the flange portion 14a is formed is disposed in the cap 14. The rotor vane blades 19 which are disposed on the side of the upstream end of the rotor vane 15 are housed in the space portion 14b. One end of the center shaft 24 which is passed through the rotor vane 15 is supported on the center shaft of the cap 14, and on the face of the cap facing to the space portion 14b.

Three nozzles 18 which communicate with the space portion 14b are disposed in the circumferential face of the cap 14. Three posts 301 are disposed on the circumferential face of the cap 14 to define channels to the nozzles 18. The nozzles 18 and the posts 301 are disposed at regular intervals along the circumferential direction of the circumferential face of the cap so that their lower faces are in contact with the upper face of the flange portion 14a. The nozzles 18 are opened toward the rotor vane blades 19 housed in the space portion 14b, and the directions of the nozzles are oriented toward the inner side with respect to the tangential direction of the circumscribed circle of the rotor vane blades 19.

Alternatively, the flange portion 14a may be formed separately from the cap 14. In the alternative, the nozzles 18 can be formed by joining the flange portion 14a with the cap 14.

According to the nozzles 18, water flowing in a direction that is substantially parallel to the axial direction (the center axis direction) of the rotor vane can be ejected from the radially outward direction of the rotor vane blades 19 toward the rotor vane blades 19 while changing the direction of the flow, in a plane which is substantially perpendicular to the axial direction (the center axis direction) of the rotor vane.

Namely, a plurality of nozzles are disposed which changes the flowing direction of water flowing in a direction that is substantially parallel to the axial direction of the rotor vane, to a direction that is substantially perpendicular to the axial direction (the center axis direction) of the rotor vane, to eject the water from the radially outward direction of the rotor vane blades toward the rotor vane blades.

In the case where a barrier 204 is disposed on the circumferential face of the cap 14 as shown in FIG. 8(b), water flows so as to circumvent the barrier 204. Also in this case, the disposition of the nozzles 18 enables water flowing in a direction that is substantially parallel to the axial direction of the rotor vane, to be ejected from the radially outward direction of the rotor vane blades toward the rotor vane blades while changing the direction of the flow to a direction that is substantially perpendicular to the axial direction (the center axis direction) of the rotor vane.

The direction of water ejected from the nozzles 18 is oriented toward the inner side with respect to the tangential direction of the circumscribed circle of the rotor vane blades 19.

The upstream end faces of the rotor vane blades 19 are supported by a ceiling portion 15d of the rotor vane 15, and the downstream end faces 19a are supported by a blade supporting face 15c of the rotor vane 15 (see FIG. 1). In the radially outward end face (outer circumferential face) of the rotor vane 15, therefore, the rotor vane blades 19 are not supported, and water can flow from the radially outward end face (outer circumferential face) of the rotor vane 15 toward the inner side.

As shown in FIG. 9, the rotor vane blades 19 are configured by curves, and curved in a direction along which the tip ends approach the center of the rotor vane 15. Outlet ends 19b of the rotor vane blades 19 are separated from the boss portion 15b of the rotor vane 15, and the rotor vane blades are configured so that smooth water flows along the rotor vane blades 19 are formed from the inlet side of the rotor vane blades 19 toward the outlet sides. Therefore, the impeller efficiency can be improved, and hydro energy can be efficiently converted to electric power.

The number or the rotor vane blades 19 is not equal to an integer multiple of the number of the nozzles 18. In the configuration exemplified in FIG. 9, for example, the number of the rotor vane blades 19 is eleven, and that of the nozzles 18 is three. When the number of the rotor vane blades 19 is different from an integer multiple of the number of the nozzles 18, the timings of ejections to the rotor vane blades 19 can be staggered, and hence it is possible to prevent the rotor vane 15 from generating vibrations and noises.

The outlet ends 19b of the rotor vane blades 19 are disposed so as to be projected toward the inside of the rotor vane 15 with respect to the blade supporting face 15c supporting the downstream end faces of the rotor vane blades 19. Therefore, the radial dimension of water channels 15e (see FIG. 1) which are disposed inside the blade supporting face 15c can be increased, and hence the pressure loss can be suppressed. Furthermore, the radial length of the rotor vane blades 19 can be increased, so that the area of the rotor vane blades 19 can be increased. As a result, the impeller efficiency can be improved, and hydro energy can be efficiently converted to electric power.

The positions (see FIG. 1) of the downstream end faces 19a of the rotor vane blades 19 are located downstream from the nozzles 18. Among the water flows ejected from the nozzles 18, also those which spread toward the downstream side can be caused to impinge on the rotor vane blades 19. As a result, the impeller efficiency can be improved, and hydro energy can be efficiently converted to electric power.

As shown in FIGS. 8(a) and 8(b), according to the nozzles 18, a water flow 62a which flows in a direction that is substantially parallel to the center shaft 24 can be ejected from the radially outward direction of the rotor vane 15 (rotor vane blades 19) toward the inner side, in a plane which is substantially perpendicular to the center shaft 24. Therefore, the formation of a flow which tends to spread to the outside can be suppressed, and hence a bypass flow which flows into the bypass channels can be suppressed.

The disposition of the nozzles 18 which eject the water flow 62a flowing in a direction that is substantially parallel to the axial direction of the rotor vane, from the radially outward direction of the rotor vane blades 19 toward the inner side while changing the direction of the flow enables ejection flows to impinge on the rotor vane blades 19 while suppressing the dispersion, and hence the rotor vane 15 can be stably rotated.

In the case where only a single nozzle is disposed which ejects a water flow flowing in a direction that is substantially parallel to the axial direction of the rotor vane, from the radially outward direction of the rotor vane blades toward the inner side while changing the direction of the flow, the ejection flow cannot impinge on the rotor vane blades while suppressing the dispersion, and the rotor vane cannot be stably rotated.

Figure 10:
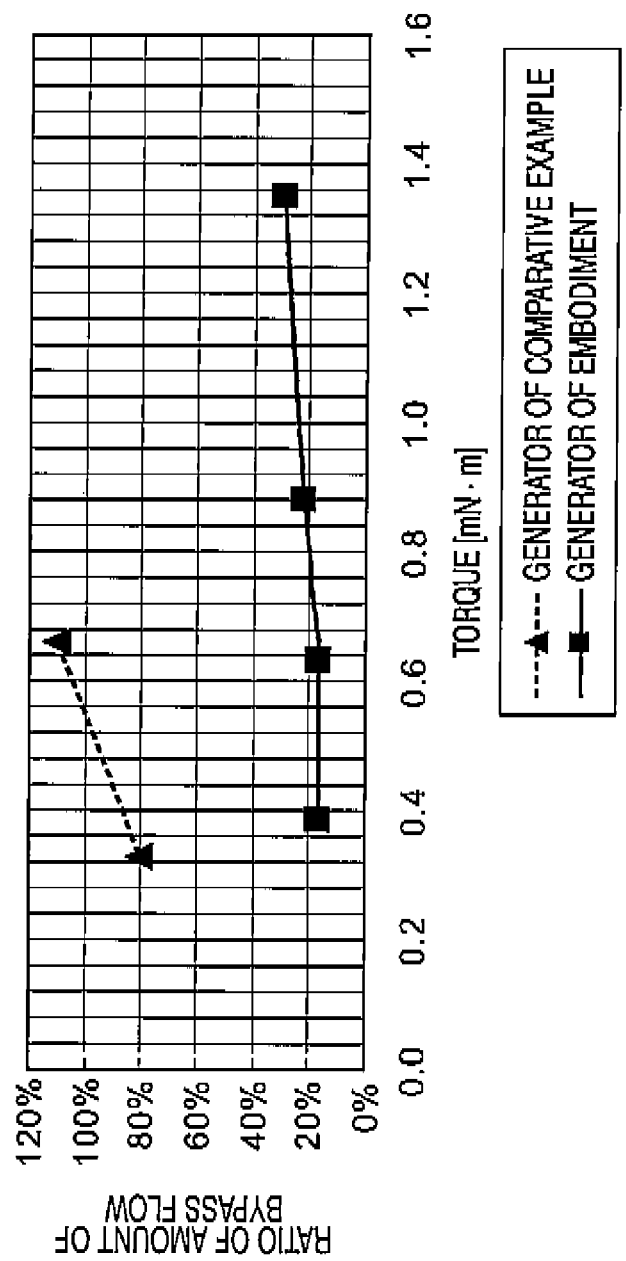
FIG. 10 is a graph illustrating suppression of a bypass flow.

FIG. 10 is a graph illustrating suppression of the bypass flow.

FIG. 10 shows results of simulations in which the ratio of the amount of the bypass flow (the amount of a flow to the bypass channels) to the total amount of water was obtained while the number of rotations was set to 2,500 rpm and the flow amount was set to 1.8 liters/minute. The ordinate indicates the ratio of the amount of the bypass flow to the total amount of water, and the abscissa indicates the torque which is applied to the rotor vane. In the figure, each "▲" indicates the generator 100 of the comparative example which has been described with reference to FIG. 6, and each "■" indicates the generator 1 of the embodiment.

As seen from FIG. 10, according to the embodiment, the ratio of the amount of the bypass flow to the total amount of water can be suppressed to ¼ or less.

In the generator 100 of the comparative example, when the flow speed is raised in order to increase the torque, the ratio of the amount of the bypass flow is increased. By contrast, in the generator 1 of the embodiment, even when the flow speed is raised in order to increase the torque, the ratio of the amount of the bypass flow can be maintained substantially constant. Therefore, the ratio of the amount of the bypass flow can be suppressed also under various conditions corresponding to a wide variety of use conditions. In the generator 100 of the comparative example, there is a portion where the ratio of the amount of the bypass flow exceeds 100%. This seems to be caused by the phenomenon where water which has once flowed toward the downstream side is caused to counterflow by a negative pressure generated between the pre-rotation stator vane 114 and the rotor vane 115.

Figure 11:
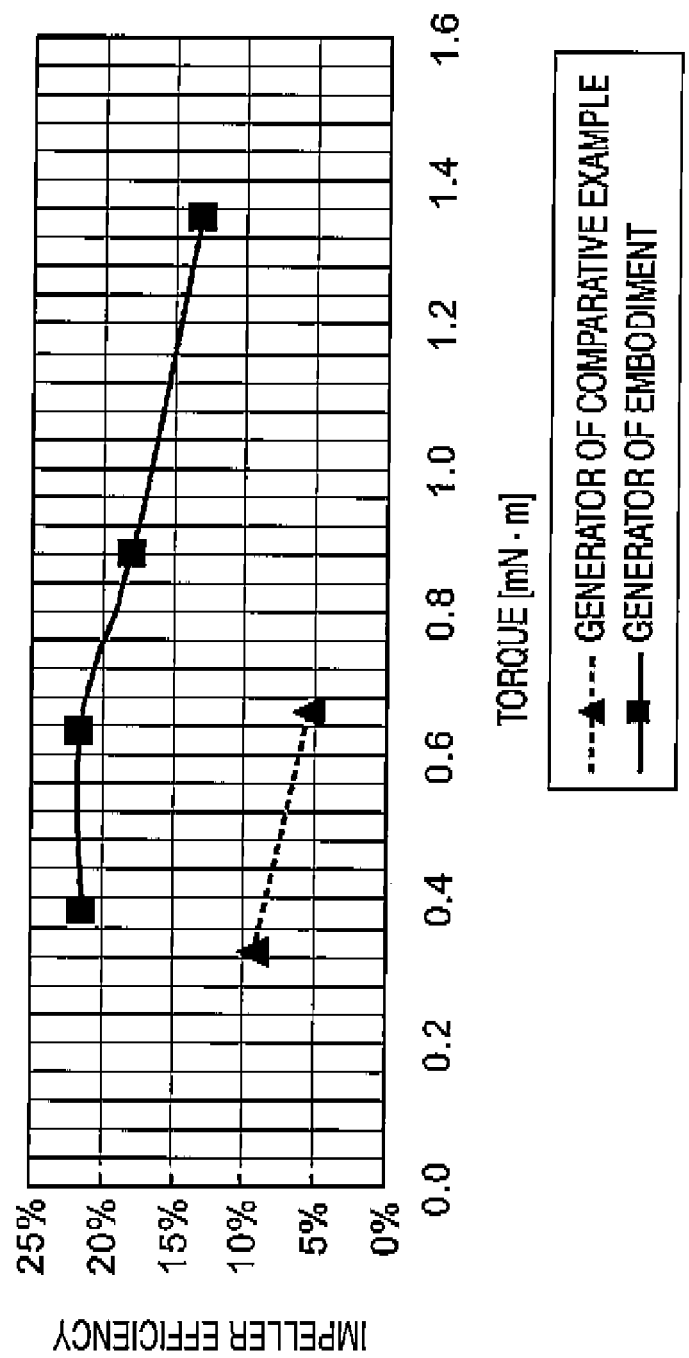
FIG. 11 is a graph illustrating the impeller efficiency.

FIG. 11 is a graph illustrating the impeller efficiency.

FIG. 11 shows results of simulations in which the impeller efficiency was obtained while the number of rotations was set to 2,500 rpm and the flow amount was set to 1.8 liters/minute. The ordinate indicates the impeller efficiency, and the abscissa indicates the torque which is applied to the rotor vane. In the figure, each "▲" indicates the generator 100 of the comparative example which has been described with reference to FIG. 6, and each "■" indicates the generator 1 of the embodiment.

As seen from FIG. 11, according to the embodiment, the impeller efficiency can be improved twice or more. Even when the flow speed is raised in order to increase the torque, the reduction of the impeller efficiency can be suppressed. Therefore, the impeller efficiency can be maintained high also under various conditions corresponding to a wide variety of use conditions, and hydro energy can be efficiently converted to electric power.

Figure 12:
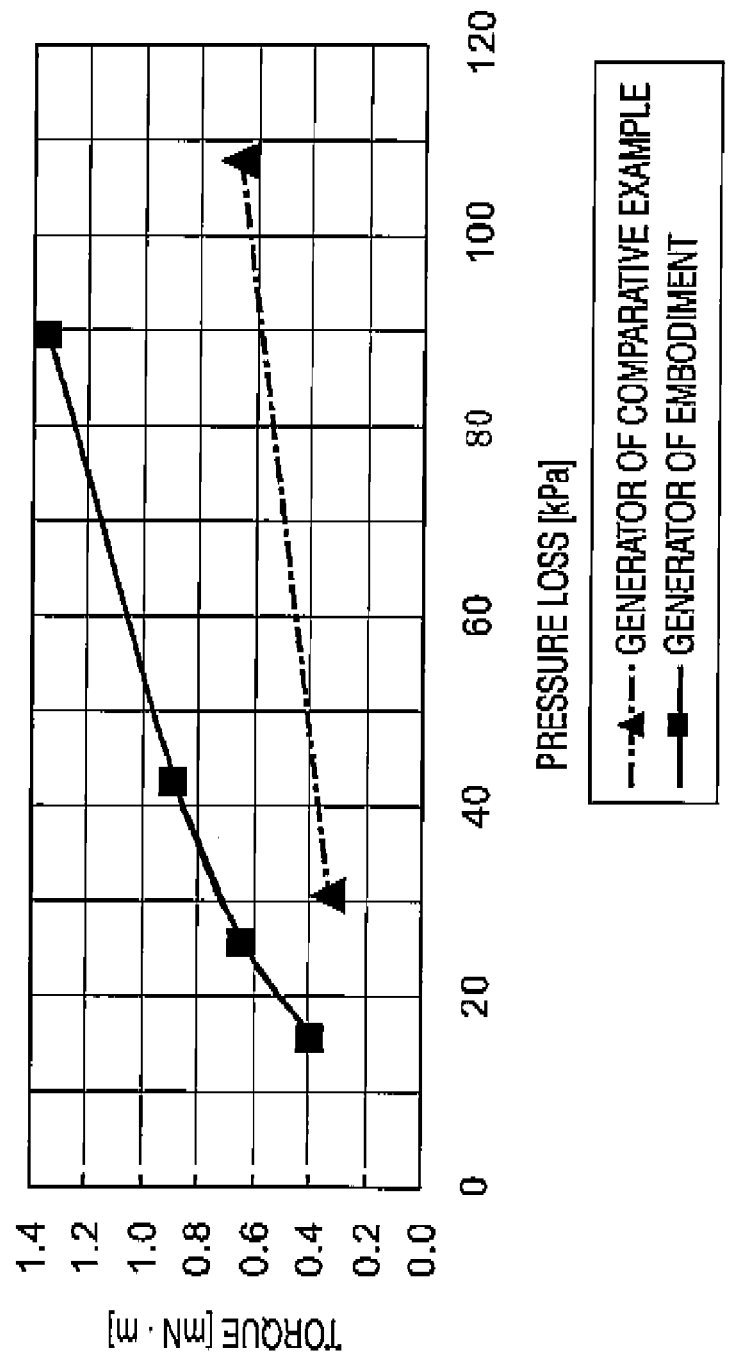
FIG. 12 is a graph illustrating relationships between a torque and a pressure loss.

FIG. 12 is a graph showing relationships between the torque and the pressure loss.

FIG. 12 shows results of simulations in which the pressure loss was obtained while the number of rotations was set to 2,500 rpm and the flow amount was set to 1.8 liters/minute. The ordinate indicates the torque which is applied to the rotor vane, and the abscissa indicates the pressure loss. In the figure, each "▲" indicates the generator 100 of the comparative example which has been described with reference to FIG. 6, and each "■" indicates the generator 1 of the embodiment.

In a generator used in a usual faucet apparatus, it is preferable to set the generated electricity amount to be 50 mW or more. In such a case, the rotor vane must obtain a torque of 0.65 mN·m or more.

As seen from FIG. 12, in order that the rotor vane obtains a torque of 0.65 mN·m or more, the pressure loss must be 108 kPa or higher in the generator 100 of the comparative example. By contrast, in the generator 1 of the embodiment, it is required only that the pressure loss is 25 kPa or higher. Therefore, a high torque can be obtained also under various conditions corresponding to a wide variety of use conditions, and hydro energy can be efficiently converted to electric power.

As described above, a faucet apparatus has various uses, and is used in a wide variety of use environments. In Japan, for example, the water pressure of a water pipe to which the faucet apparatus is mounted may be sometimes as low as about 50 kPa. In such a case, the generator 100 of the comparative example cannot ensure a required torque. By contrast, in the generator 1 of the embodiment, it is possible to ensure a sufficient torque in an environment of such a low water pressure.

Although, for the sake of convenience in description, the magnetic fluxes from the outer circumferential face of the magnet M are guided to the coil 50 which is disposed to be opposed to the end face of the magnet M that is substantially perpendicular to a radial direction, through the inductors 31*a*, 32*a*. The manner of placing the coil, the magnet, and the inductors are not restricted to this. For example, a generator having "radial arrangement" in which a coil is disposed radially outside a magnet may be employed, or a generator having "axial arrangement" in which a coil is disposed so as to be opposed to an end face of a magnet that is substantially perpendicular to a radial direction may be employed.

Figure 13:
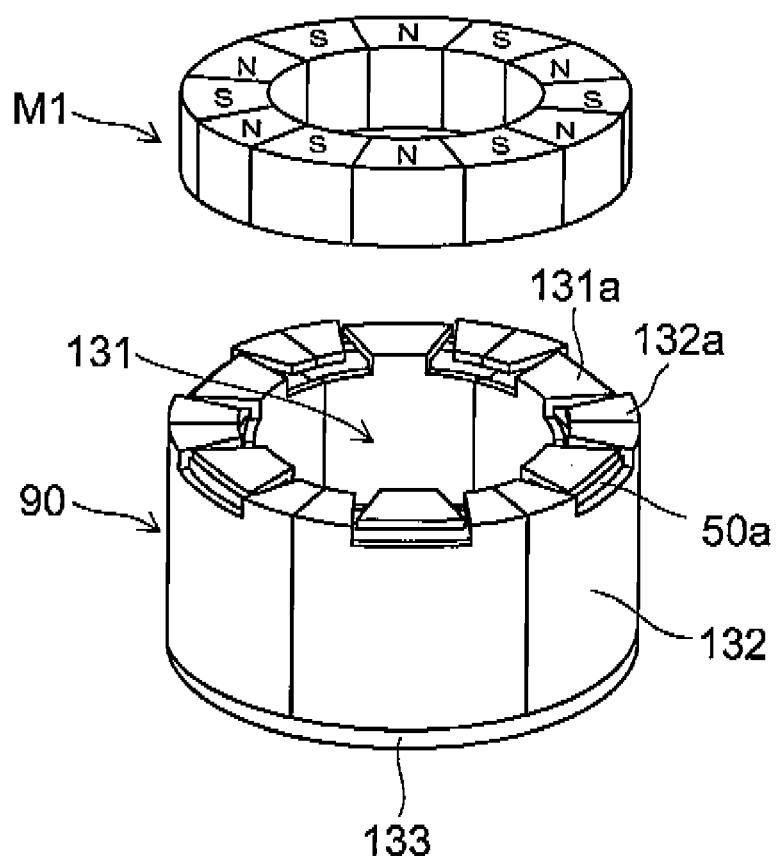
FIG. 13 is a schematic exploded view illustrating a generator having "axial arrangement".

FIG. 13 is a schematic exploded view illustrating a generator having "axial arrangement".

The end faces of a magnet M1 which are substantially perpendicular to a radial direction are alternately magnetized with N and S poles along the circumferential direction.

A stator 90 has: first to third yokes 131 to 133 all of which are made of a soft magnetic material (for example, rolled steel); inductors 131*a*, 132*a* which are continuously contacted with the first and second yokes 131, 132; and a coil 50*a* which is placed in a space surrounded by the first to third yokes 131 to 133 and the inductors 131*a*, 132*a*. The third yoke 133 is coupled to the end portion opposite to that where the inductors 131*a*, 132*a* for the first and second yokes 131, 132 are disposed.

The coil 50*a* is disposed to be opposed to the end face of the magnet M1 which is substantially perpendicular to a radial direction. The inductors 131*a*, 132*a* have a portion which is opposed to the magnet M1 in a direction that is substantially perpendicular to a radial direction, and are disposed to separate from each other.

Also in the embodiment, the radial dimension of the generator can be reduced. When the nozzles 18, the rotor vane blades 19, and the like are configured as described above, the bypass flow flowing into the bypass channels can be suppressed.

Although, for the sake of convenience in description, the nozzles which eject water flowing in a direction that is substantially parallel to the axial direction of the rotor vane, from the radially outer side of the rotor vane blades toward the rotor vane blades, in a plane which is substantially perpendicular to the axial direction of the rotor vane have been described, the invention is not restricted to this. Alternatively, nozzles which eject water flowing in a direction that is substantially parallel to the axial direction of the rotor vane, from the radially outer side of the rotor vane blades toward the rotor vane blades, at a predetermined angle with respect to a plane which is substantially perpendicular to the axial direction of the rotor vane may be provided.

Figure 14:
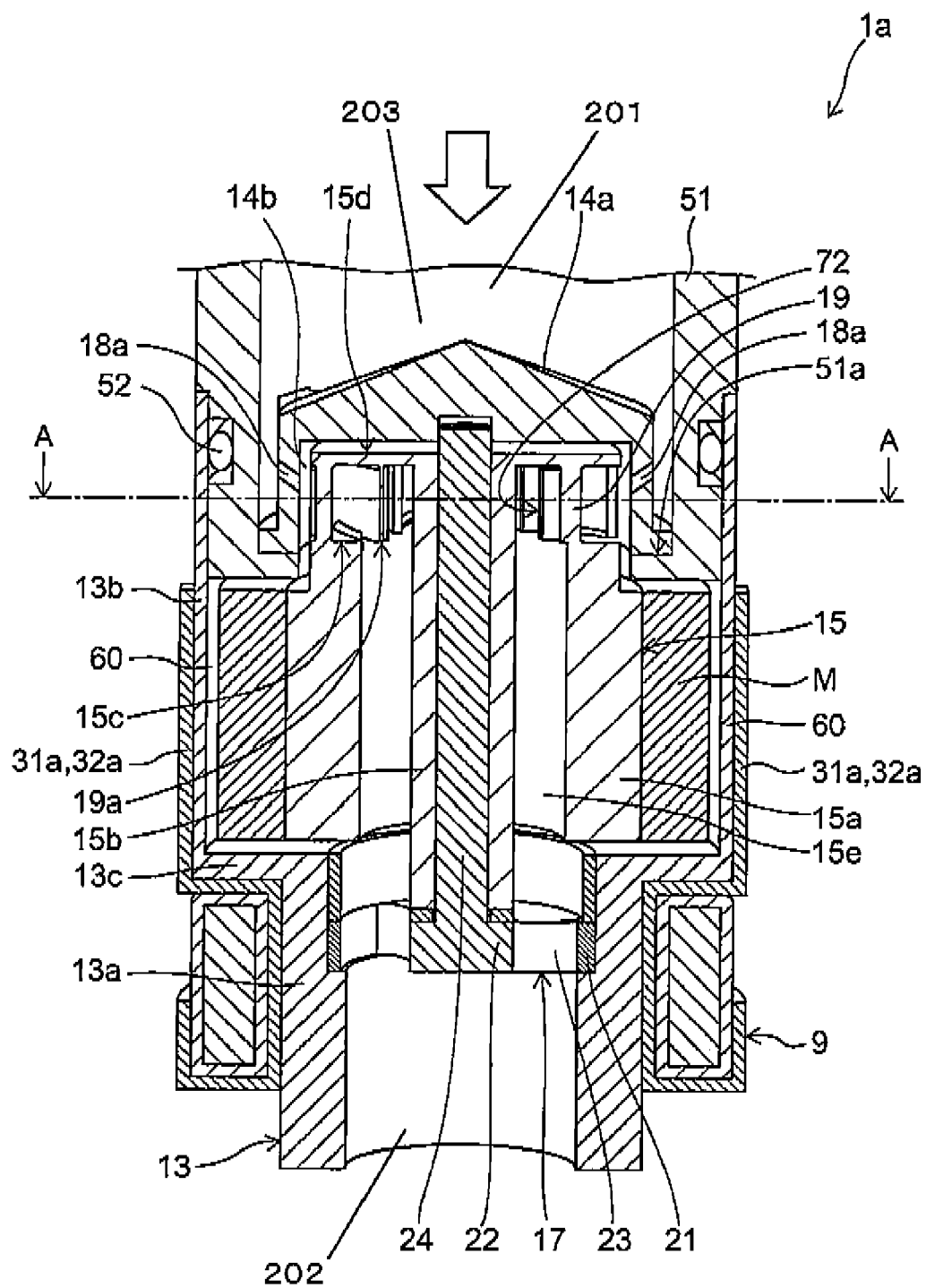
FIG. 14 is a schematic sectional view of a generator of another embodiment of the invention.

FIG. 14 is a schematic sectional view of a generator of another embodiment of the invention.

The components which are identical with those which have been described with reference to FIG. 1 are denoted by the same reference numerals, and their description is omitted.

Three nozzles 18*a* which communicate with the space portion 14*b* are disposed in the circumferential face of the cap 14*a* disposed in the generator 1*a*. The nozzles 18*a* are disposed at regular intervals along the circumferential direction of the circumferential face of the cap. The nozzles 18*a* are opened toward the rotor vane blades 19 housed in the space portion 14*b*, and the directions of the nozzles are oriented toward the inner side with respect to the tangential direction of the circumscribed circle of the rotor vane blades 19. The nozzles 18*a* are disposed so as to form a predetermined angle with respect to a plane which is substantially perpendicular to the axial direction of the rotor vane.

According to the nozzles 18*a*, water which flows in a direction that is substantially parallel to the axial direction (the center axis direction) of the rotor vane can be ejected from the radially outward direction of the rotor vane blades toward the rotor vane blades, at the predetermined angle with respect to the plane which is substantially perpendicular to the axial direction of the rotor vane. In the configuration shown in FIG. 14, water is ejected from an obliquely upper side toward the rotor vane blades.

In this case, when projected to the plane which is substantially perpendicular to the axial direction of the rotor vane, the direction of the water ejected from the nozzles 18 is oriented toward the inner side with respect to the tangential direction of the circumscribed circle of the rotor vane blades 19.

Next, the generator and automatic faucet apparatus according to the embodiment of the invention will be described. When the user introduces a hand under the water discharging port 6 shown in FIGS. 2 and 3, the introduction is sensed by the sensor 7, and the solenoid valve 8 is opened by the controller 57. This causes flowing water to be supplied into the cylindrical body 13 of the generator 1, and the water flows inside the cylindrical body 13 to be discharged from the water discharging port 6. When the user removes the hand from area under the water discharging port 6, this is sensed by the sensor 7, and the solenoid valve 8 is closed by the controller 57 to automatically stop the water flow.

Figure 8:
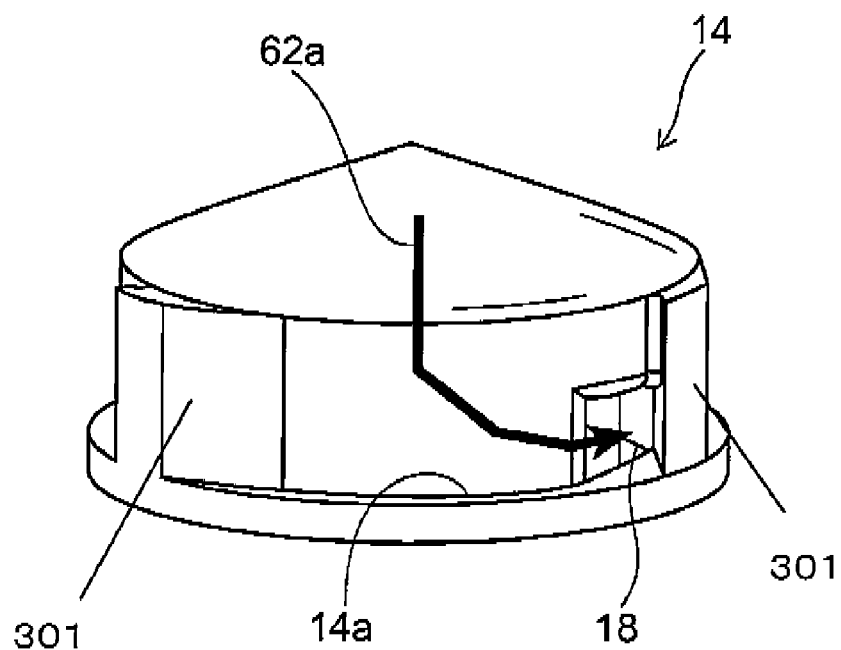
FIG. 8 is a schematic perspective view illustrating a cap disposed in the generator of the embodiment.
Figure 8:
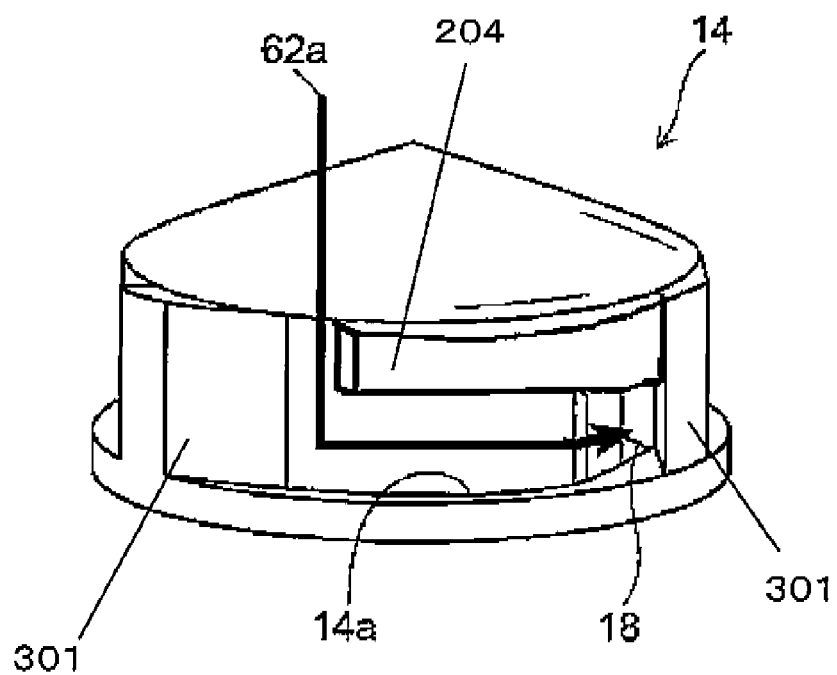

The flowing water flowing into the cylindrical body 13 flows over the surface of the conical member of the pre-rotation stator vane 114 to spread radially outward. As shown in FIGS. 8(*a*) and 8(*b*), the water flow 62*a* flowing in a direction that is substantially parallel to the center shaft 24 is ejected from the nozzles 18 toward the rotor vane blades 19 in the plane which is substantially perpendicular to the center shaft 24.

The water which is ejected toward the rotor vane blades 19 flows through the rotor vane channels 72 from the inlet side of the rotor vane blades 19 toward the outlet sides along the rotor vane blades 19, and then passes through the inside of the water channels 15*e* and the bearing 17, and the interior of the cylindrical body 13 to reach the water discharging port 6.

When the rotor vane 15 is rotated by the force of the water which is ejected toward the rotor vane blades 19, also the magnet M fixed to the vane is rotated. As shown in FIG. 4, the end faces (outer circumferential face) of the magnet M in a radially outward direction are alternately magnetized with N and S poles along the circumferential direction (rotational direction). When the magnet M is rotated, therefore, the polarities of the inductors 31*a*, 32*a* which are opposed to one of the end face (outer circumferential face) of the magnet M in the radially outward direction, and those of the first and second yokes 31, 32 which are continuously contacted with the inductors are changed. As a result, the directions of interlinking magnetic fluxes with respect to the coil 50 are changed, and an electromotive force is produced in the coil 50, thereby performing electricity generation. Also in the case which is exemplified in FIG. 13, an electromotive force is similarly produced in the coil 50*a*. The generated power is stored in the charger 56, and then used in the driving of, for example, the solenoid valve 8, the sensor 7, and the controller 57, and the like.

What is claimed is:

1. A faucet generator comprising:
a cylindrical body which has a water inflow port and a water outflow port, and in which a water supply channel is formed;
a rotor vane which has rotor vane blades, and which is disposed in said water supply channel;
a magnet which is rotatable integrally with said rotor vane;
a coil in which an electromotive force is produced by rotation of said magnet; and
a plurality of nozzles which eject water toward said rotor vane blades,
wherein an axial direction of said rotor vane is substantially parallel to said water supply channel, and
said nozzles change a direction of a water flow which is substantially parallel to the axial direction of said rotor vane, to eject water from a radially outward direction of said rotor vane blades to said rotor vane blades.

2. A faucet generator according to claim 1, wherein said nozzles change the flow to a direction which is substantially perpendicular to the axial direction.

3. A faucet generator according to claim 1, wherein said magnet is disposed between said rotor vane blades and said water outflow port.

4. A faucet generator according to claim 2, wherein said magnet is disposed between said rotor vane blades and said water outflow port.

* * * * *